UNITED STATES PATENT OFFICE.

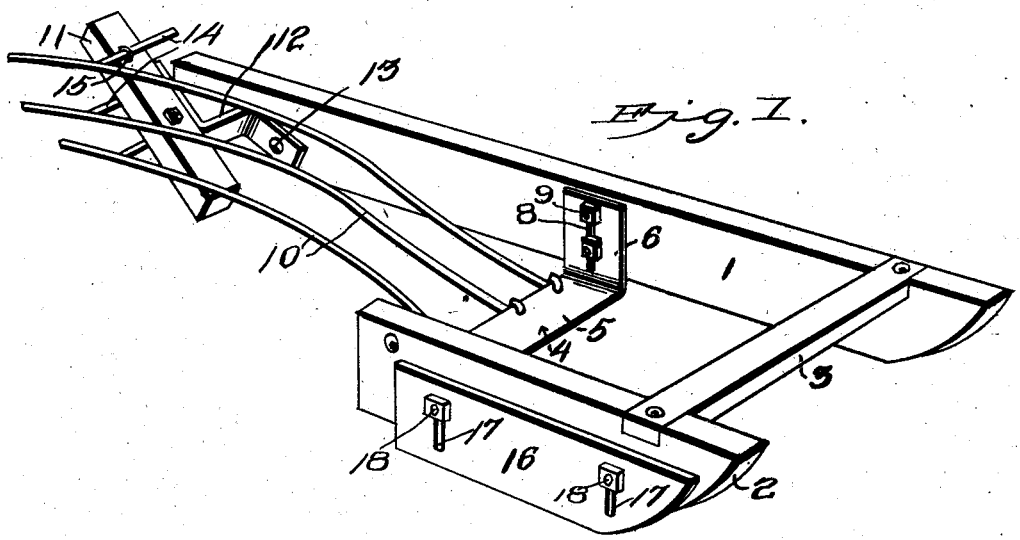

WILLIAM NELSON FLETCHER, OF CLAUDE, TEXAS.

SOD-TURNING PLOW.

SPECIFICATION forming part of Letters Patent No. 721,291, dated February 24, 1903.

Application filed May 12, 1902. Serial No. 106,951. (No model.)

*To all whom it may concern:*

Be it known that I, WILLIAM NELSON FLETCHER, a citizen of the United States, residing at Claude, in the county of Armstrong and State of Texas, have invented a new and useful Sod-Turning Plow, of which the following is a specification.

My invention is an improved sod-turning plow especially adapted for turning prairie-sod; and it consists in the peculiar construction and combination of devices hereinafter fully set forth and claimed.

In the accompanying drawings, Figure 1 is a perspective view of a sod-turning plow embodying my improvements. Fig. 2 is a vertical transverse sectional view of the same.

In the embodiment of my invention I provide a relatively long land-side runner 1 and a short runner 2, which is abreast of the front portion of the land-side runner and is connected thereto by a cross-bar 3, the same being secured to the said runners on their upper sides and at a suitable distance from their front ends.

The sod-cutting share 4 is substantially U-shaped and comprises the horizontally-disposed cutter 5 and the vertical standard-arms 6 7 at the ends thereof, which are respectively disposed on and against the inner sides of the runners 1 2 and are provided with vertical slots 8. Bolts 9, which extend through the slots 8, secure the standard-arms of the share to the runners, hence securing the share between the runners, and said vertical slots 8 admit of the vertical adjustment of the share, as will be understood, so that the same may be disposed to operate at any desired depth below the runners, according to the depth of the roots of the sod on which the plow is to be used. The front edge of the share will be sharpened, as will also be the front edges of the lower portions of the standard-arms thereof, to enable the same to readily cut the sides and to run under the sod.

Turning-bars 10 are secured to the rear side of the share and extend rearwardly therefrom. Said turning-bars are inclined upwardly and rearwardly and are disposed, respectively, with their rear ends at different elevations and with such relation to each other laterally that the same cause the sod as it cut by the share to slide rearwardly on the said turning-bars and to be by them overturned, the said turning-bars of my improved sod-cutting plow performing the function of the moldboard of an ordinary turning-plow.

It will be observed by reference to the drawings that the turning-bars are curved laterally in one direction, so that their rear ends are disposed practically in line with the shorter outer runner 2. An inclined adjusting-bar 11 is here shown as connected to the inner side of the land-side runner, near the rear end thereof, by a bracket 12, which bracket has its front end pivotally connected to and adjustably secured on the inner side of the land-side runner by a clamping-bolt 13, which may be of any suitable construction. Within the scope of my invention the adjusting-bar may be secured to the land-side runner by any suitable means which will admit of the adjustment of the said bar, so that the latter may be disposed at any desired inclination to vary the inclination of the turning-bars as may be required. Each of the turning-bars is provided with a laterally-extended arm 14. The said arms of the turning-bars extend across the adjusting-bar and are adjustably secured thereto by any suitable means which will admit of the endwise movement of said arms 14 and the lateral adjustment of the turning-bars. For the purposes of this specification I show clip-bolts 15, which extend through the adjusting-bar, engage the arms 14, and hence adjustably connect the latter to the said adjusting-bar. A leveling-runner 16 is adapted to be disposed on either side of the outer runner 2 and to be vertically adjusted thereon, so that the lower side of the said leveling-runner may be disposed at any desired distance below the runner 2. The latter runs in the furrow, as will be understood. The land-side runner 1 operates on the unturned sod, and hence the function of the leveling-runner 16 is to keep the share in a horizontal position, so that it will cut the sod at the same depth throughout the entire lateral extent of the furrow. Within the scope of my invention any suitable means may be employed to adjustably secure the leveling-runner to the runner 2. For the purposes of this specification I show the leveling-runner as provided with vertical slots 17 and show bolts 18 to connect the said leveling-runner to the runner 2, said bolts being disposed in said slots. This enables the leveling-runner to be secured either on the inner or the outer side of the runner 2. When the leveling-runner is secured to the inner side of the runner 2, as indicated in dotted lines in Fig. 2, the plow will cut a narrower sod than when said leveling-runner is on the outer side of said runner 2, as will be understood. Hence said leveling-runner may be also used to regulate the width of the furrow or sod cut by the plow.

Having thus described my invention, I claim—

1. In a sod-turning plow, the combination of a share to cut under and cut the sides of a sod, an inclined adjusting and adjustable bar, and turning-bars extending rearwardly from the share and having laterally-extending arms adjustably secured to the said adjusting-bar, substantially as described.

2. A sod-turning plow comprising a pair of runners, a sod-cutting share disposed between them, an inclined adjusting-bar adjustably secured to one of the runners at a point in rear of the share, and turning-bars extending rearwardly from the share and having laterally-extending arms adjustably secured to the adjusting-bar, substantially as described.

3. In a sod-turning plow, the combination of a share to cut under and cut the sides of a sod, turning-bars extending rearwardly from the share to overturn the sod cut thereby and having laterally-extending arms, an inclined adjusting-bar, and means to adjustably secure the said arms on said adjusting-bar, whereby the rear portions of the turning-bars may be laterally adjusted, substantially as described.

4. A sod-plow comprising a land-side runner, a furrow-runner, a sod-cutting share disposed between the said runners and a leveling-runner secured to said furrow-runner and vertically adjustable thereon, substantially as described.

5. In combination with a sod-plow comprising a land-side runner, a furrow-runner and a sod-cutting share disposed between the said runners, a leveling-runner and means to secure the same to either side of the furrow-runner and vertically adjust it thereon, substantially as described.

In testimony that I claim the foregoing as my own I have hereto affixed my signature in the presence of two witnesses.

WILLIAM NELSON FLETCHER.

Witnesses:
S. P. HAMBLEN,
D. W. BADGBY.